United States Patent
Lee et al.

(10) Patent No.: US 10,075,904 B2
(45) Date of Patent: Sep. 11, 2018

(54) METHOD FOR TRANSMITTING AND RECEIVING SIGNAL IN COMMUNICATION ENVIRONMENT IN WHICH MULTIPLE COMMUNICATION SYSTEMS INTERWORK, AND APPARATUS THEREFOR

(71) Applicant: LG ELECTRONICS INC., Seoul (KR)

(72) Inventors: Eunjong Lee, Seoul (KR); Jaehoon Chung, Seoul (KR); Hyeyoung Choi, Seoul (KR); Heejeong Cho, Seoul (KR); Genebeck Hahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 173 days.

(21) Appl. No.: 15/036,790

(22) PCT Filed: Jul. 9, 2014

(86) PCT No.: PCT/KR2014/006150
§ 371 (c)(1),
(2) Date: May 13, 2016

(87) PCT Pub. No.: WO2015/072648
PCT Pub. Date: May 21, 2015

(65) Prior Publication Data
US 2016/0286470 A1    Sep. 29, 2016

Related U.S. Application Data

(60) Provisional application No. 61/904,462, filed on Nov. 15, 2013.

(51) Int. Cl.
*H04W 48/16* (2009.01)
*H04W 48/20* (2009.01)
(Continued)

(52) U.S. Cl.
CPC .......... *H04W 48/16* (2013.01); *H04W 48/20* (2013.01); *H04W 74/0833* (2013.01);
(Continued)

(58) Field of Classification Search
CPC . H04W 48/16; H04W 48/20; H04W 74/0833; H04W 74/08; H04W 84/12; H04W 84/005; H04W 48/12; H04W 48/18
(Continued)

(56) References Cited

U.S. PATENT DOCUMENTS

2004/0063430 A1* 4/2004 Cave ................ H04W 16/28
                                                                    455/436
2005/0254454 A1* 11/2005 Ozluturk ............ H04W 88/06
                                                                    370/328
(Continued)

FOREIGN PATENT DOCUMENTS

WO    2012-047020    4/2012
WO    2012-138079    10/2012
(Continued)

OTHER PUBLICATIONS

Korean Intellectual Property Office Application No. 10-2016-7011525, Notice of Allowance dated Mar. 30, 2017, 3 pages.
(Continued)

*Primary Examiner* — Kwang B Yao
*Assistant Examiner* — Syed M Bokhari
(74) *Attorney, Agent, or Firm* — Lee Hong Degerman Kang & Waimey

(57) ABSTRACT

A user equipment in a communication environment in which a plural communication systems interwork comprises: a processor for searching a base station of a first communication system, the base station having a signal intensity higher than a threshold; and a receiver for receiving information of a base station list of a second communication
(Continued)

system adjacent to the terminal through a first communication system link from the searched base station of the first communication system, wherein the processor turns on a second communication system mode in the case of failing in random access channel (RACH) transmissions a predetermined number of times to the searched base station of the first communication system, wherein the receiver receives a beacon signal including an indicator which indicates support of an uplink transmission of the first communication system from base stations included in the information of the base station list of the second communication system; the processor recognizes that an uplink transmission is disabled or only a downlink transmission is enabled through the first communication system link based on the beacon signal; and the information of the base station list of the second communication system may include an indicator which indicates whether the base station of the second communication system supports a downlink (DL) or uplink (UL) transmission through the first communication system link.

10 Claims, 15 Drawing Sheets

(51) Int. Cl.
  *H04W 74/08* (2009.01)
  *H04W 48/18* (2009.01)
  *H04W 48/12* (2009.01)
  *H04W 84/12* (2009.01)

(52) U.S. Cl.
  CPC ............ *H04W 48/12* (2013.01); *H04W 48/18* (2013.01); *H04W 84/12* (2013.01)

(58) Field of Classification Search
  USPC .......................... 370/329, 320, 328, 230, 232
  See application file for complete search history.

(56) References Cited

U.S. PATENT DOCUMENTS

| | | | |
|---|---|---|---|
| 2008/0310358 A1 | 12/2008 | Shaheen | |
| 2011/0044244 A1* | 2/2011 | Etemad | H04W 72/085 370/328 |
| 2013/0242783 A1 | 9/2013 | Horn et al. | |
| 2014/0133294 A1* | 5/2014 | Horn | H04W 28/0247 370/230 |
| 2014/0133304 A1* | 5/2014 | Pica | H04W 48/20 370/232 |

FOREIGN PATENT DOCUMENTS

| | | |
|---|---|---|
| WO | 2012138711 | 10/2012 |
| WO | 2013-138711 | 9/2013 |

OTHER PUBLICATIONS

PCT International Application No. PCT/KR2014/006150, Written Opinion of the International Searching Authority dated Nov. 3, 2014, 16 pages.

\* cited by examiner

METHOD FOR TRANSMITTING AND RECEIVING SIGNAL IN COMMUNICATION ENVIRONMENT IN WHICH MULTIPLE COMMUNICATION SYSTEMS INTERWORK, AND APPARATUS THEREFOR

CROSS-REFERENCE TO RELATED APPLICATIONS

This application is the National Stage filing under 35 U.S.C. 371 of International Application No. PCT/KR2014/006150, filed on Jul. 9, 2014, which claims the benefit of U.S. Provisional Application No. 61/904,462, filed on Nov. 15, 2013, the contents of which are all hereby incorporated by reference herein in their entirety.

TECHNICAL FIELD

The present invention relates to wireless communication and, more specifically, to a method of transmitting and receiving a signal in a communication environment in which multiple communication systems interwork, and an apparatus therefor.

BACKGROUND ART

Wireless communication systems may include a multi-RAT UE having capability to access two or more radio access technologies (RATs) or communication systems. To access a specific RAT, connection to the specific RAT is established on the basis of a UE request and transmission/reception of data is performed. However, a multi-RAT UE cannot simultaneously access multiple RATs even if the multi-RAT UE has capability to access two or more RATs. That is, the multi-RAT UE cannot simultaneously transmit and receive data through different RATs even if the UE has multi-RAT capability.

Since the conventional multi-RAT scheme does not require interworking between a wireless LAN and a cellular network, system efficiency thereof is low. In addition, the conventional multi-RAT scheme supports only flow mobility/IP-flow mapping at a network level without control at a radio level even if a UE can simultaneously access multiple RATs, thereby enabling simultaneous access to multiple RATs. For this reason, the conventional scheme has been performed on the basis of a request of the UE without requiring control connection between an AP and a cellular network.

However, such conventional scheme selects RATs for a UE without recognizing an accurate network state, and thus there is a limitation in enhancement of network efficiency. Particularly, as UEs can access multiple communication systems, UEs requires methods to perform efficient data switching from a specific communication system to another communication system. However, research thereon has not been performed.

DISCLOSURE

Technical Problem

An object of the present invention devised to solve the problem lies in a method of receiving a downlink signal by a UE in a communication environment in which multiple communication systems interwork.

Another object of the present invention is to provide a method of transmitting an uplink signal by a UE in a communication environment in which multiple communication systems interwork.

Yet another object of the present invention is to provide a UE for receiving a downlink signal in a communication environment in which multiple communication systems interwork Still another object of the present invention is to provide a UE for transmitting an uplink signal in a communication environment in which multiple communication systems interwork.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of receiving a downlink signal by a UE in a communication environment in which a plural communication systems interwork includes: receiving information of a list of base stations of a second communication system adjacent to the UE from a base station of a first communication system through a first communication system link; when quality of downlink signals received from the base station of the first communication system do not continuously satisfy a threshold a predetermined number of times, turning on a second communication system mode based on the information of the list of base stations of the second communication system and receiving a beacon signal or a probe response message from a base station included in the list of base stations of the second communication system, through a second communication system link, the base station included in the list of base stations of the second communication system supporting downlink transmission of the first communication system; and based on the beacon signal or the probe response message, recognizing that downlink transmission through the first communication system link is impossible or only uplink transmission through the first communication system link is possible, wherein the beacon signal or the probe response message includes an indicator indicating support of downlink transmission of the first communication system, wherein the information of the list of base stations of the second communication system includes an indicator indicating whether a base station of the second communication system supports downlink or uplink transmission through the first communication system link.

The method may further include transmitting an indicator indicating that the downlink signal from the base station of the first communication system will be received from a base station supporting downlink transmission of the first communication system.

The method may further include performing an association procedure with the base station supporting downlink transmission of the first communication system; and receiving downlink data or system information of the base station of the first communication system from the base station supporting the downlink transmission of the first communication system through the second communication system link. The method may further include transmitting uplink data to the base station of the first communication system through the first communication system link.

The first communication system may be a cellular communication system and the second communication system may be a wireless LAN (WLAN) communication system. The base station supporting downlink transmission of the first communication system may be a BS belonging to the second communication system and delivering a downlink signal received through the first communication system link to the UE.

In another aspect of the present invention, a method of transmitting an uplink signal by a UE in a communication environment in which multiple communication systems interwork includes: searching for a base station of a first communication system, the base station having signal intensity of higher than a threshold; receiving, from the searched base station of the first communication system, information of a list of base stations of a second communication system adjacent to the UE through a first communication system link; turning on a second communication system mode when failing in a predetermined number of random access channel (RACH) transmissions to the searched base station of the first communication system; receiving a beacon signal including an indicator indicating support of uplink transmission of the first communication system from a base station included in the information of the list of base stations of the second communication system; and based on the beacon signal, recognizing that uplink transmission through the first communication system link is impossible or only downlink transmission through the first communication system link is possible, wherein the information of the list of base stations of the second communication system includes an indicator indicating whether a base station of the second communication system supports downlink or uplink transmission through the first communication system link.

The method may further include: performing an association procedure with a base station supporting uplink transmission of the first communication system; and transmitting a RACH signal or a connection establishment request message to the base station supporting uplink transmission of the first communication system.

The base station supporting uplink transmission of the first communication system may be a base station belonging to the second communication system, receiving an uplink signal for transmission to the first communication system by the UE to the first communication system and transmitting the uplink signal to the searched base station of the first communication system. The first communication system may be a cellular communication system and the second communication system may be a wireless LAN (WLAN) communication system.

In another aspect of the present invention, a UE for receiving a downlink signal in a communication environment in which a plural communication systems interwork includes: a receiver for receiving information of a list of base stations of a second communication system adjacent to the UE from a base station of a first communication system through a first communication system link; and a processor for turning on a second communication system mode based on the information of the list of base stations of the second communication system when quality of downlink signals received from the base station of the first communication system do not continuously satisfy a threshold a predetermined number of times, after the second communication system mode is turned on, wherein the receiver receives a beacon signal or a probe response message from a base station included in the list of base stations of the second communication system through a second communication system link the base station included in the list of base stations of the second communication system supporting downlink transmission of the first communication system; based on the basis of the beacon signal or the probe response message, the processor recognizes that downlink transmission through the first communication system link is impossible or only uplink transmission through the first communication system link is possible, wherein the beacon signal or the probe response message includes an indicator indicating support of the downlink transmission of the first communication system, wherein the information of the list of base stations of the second communication system includes an indicator indicating whether a base station of the second communication system supports downlink or uplink transmission through the first communication system link.

In another aspect of the present invention, a UE for transmitting an uplink signal in a communication environment in which a plural communication systems interwork includes: a processor for searching for a base station of a first communication system, the base station having signal intensity of higher than a threshold; and a receiver for receiving, from the searched base station of the first communication system, information of a list of base stations of a second communication system adjacent to the UE through a first communication system link, wherein the processor turns on a second communication system mode when a predetermined number of RACH transmissions to the searched base station of the first communication system fail, wherein the receiver receives a beacon signal including an indicator indicating support of uplink transmission of the first communication system from a base station included in the information of the list of the second communication system; based on the beacon signal, wherein the processor recognizes that uplink transmission through the first communication system link is impossible or only downlink transmission through the first communication system link is possible, wherein the information of the list of base stations of the second communication system includes an indicator indicating whether a base station of the second communication system supports downlink or uplink transmission through the first communication system link.

Advantageous Effects

According to embodiments of the present invention, a UE capable of simultaneously accessing a WLAN (Wi-Fi) and a cellular network can transmit and receive data of the cellular network through a neighbor Wi-Fi system in a situation in which DL reception or UL transmission through the cellular network is difficult to perform, thereby remarkably enhancing communication performance.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

Figure 1:
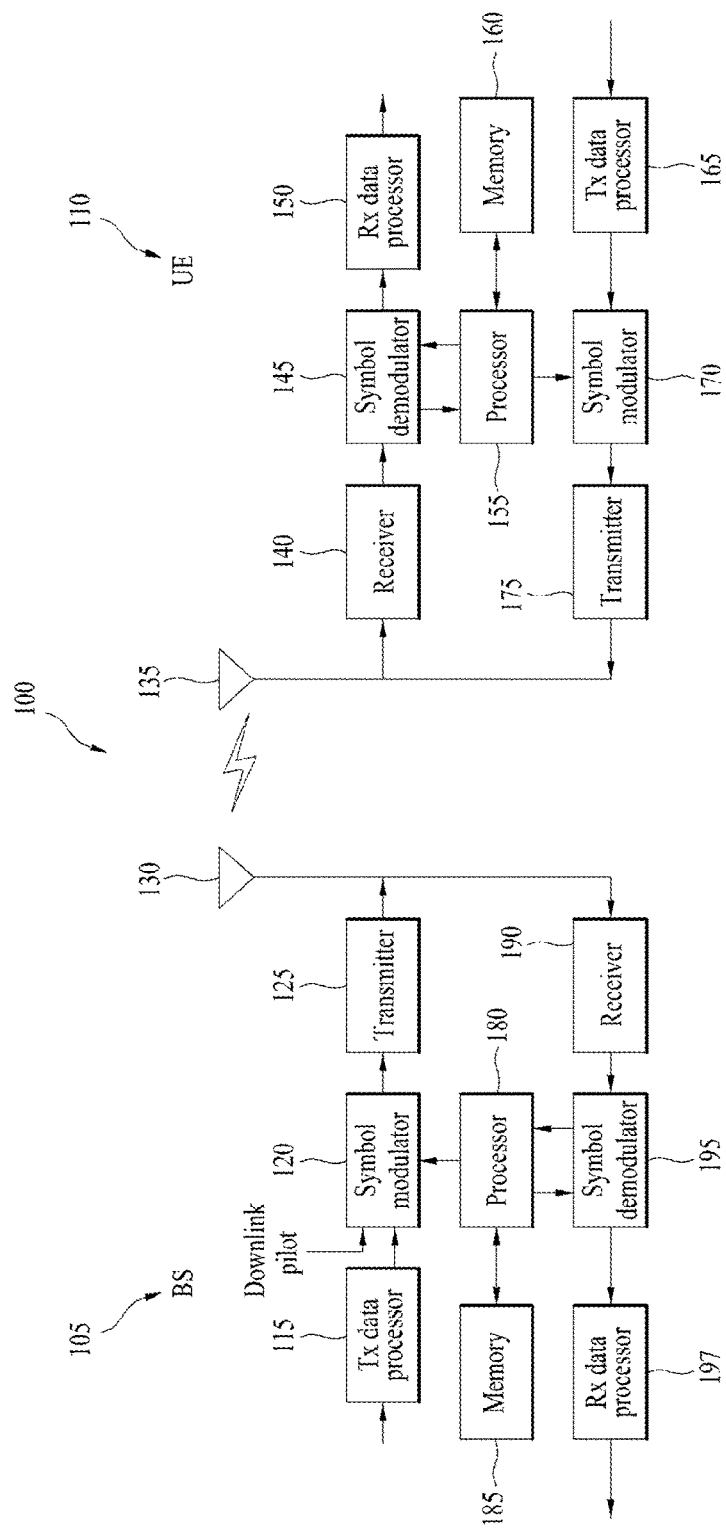
FIG. 1 is a block diagram of a base station (BS) 105 and a UE 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

A brief description will be given of multi-RAT UE based WLAN-cellular interworking. A UE having capability to access two or more radio access technologies (RATs) is referred to as a multi-RAT UE and is abbreviated to UE in the specification. To access specific RAT, connection to the specific RAT is established on the basis of a UE request and data transmission/reception is performed. Information can be exchanged between heterogeneous networks using an ANDSF server.

Figure 2:
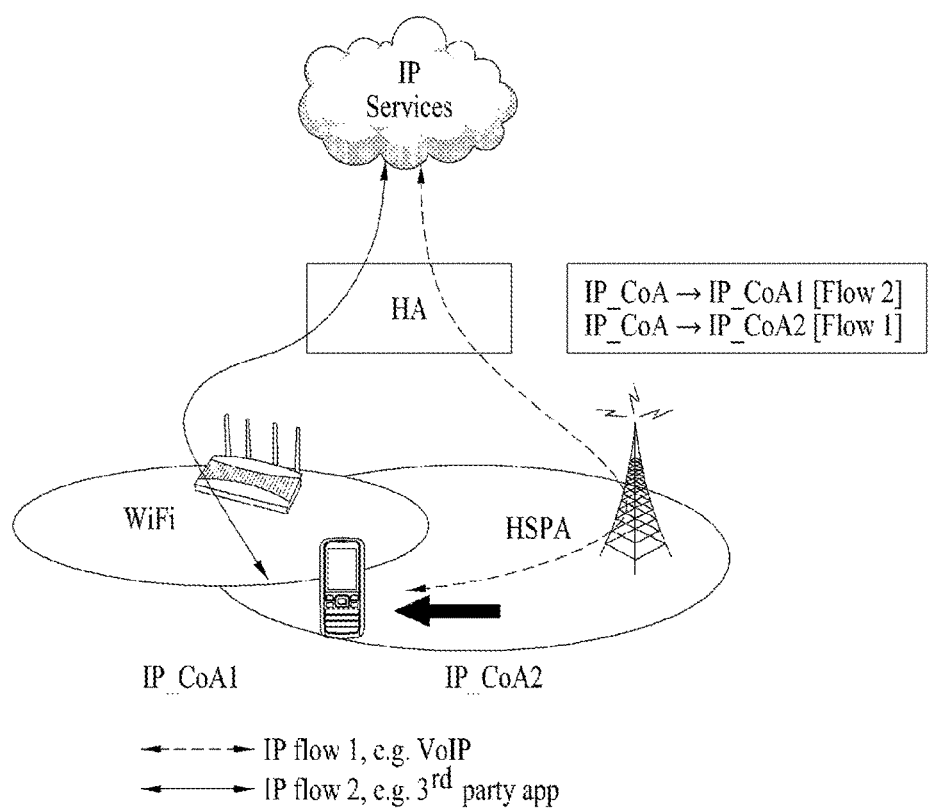
FIG. 2 is a view for explaining IP flow based Wi-Fi mobility.

FIG. 2 is a view for explaining IP flow based Wi-Fi mobility.

IFOM (IP Flow Mobility): 3GPP (Rel-10) describes 3G/Wi-Fi seamless offload and provides IP flow based WLAN offloading on the basis of DSMIPv6 and a solution through which DSMIPv6 (Dual Stack Mobile IPv6) UEs and networks simultaneously support IPv4 and IPv6. As IPv6 spreads due to diversification of mobile communication networks and mobility support emerges as a core technology, even IPv4 networks adopt DSMIPv6 since mobility support is needed. Furthermore, client-based MIP technology through which a UE detects movement thereof and notifies an agent of the detected result is provided. An HA is an agent that manages mobile node mobility and includes a flow binding table and a binding cache table. When PMIPv6 is used, IP flow mobility (IFOM) uses only DSMIPv6 due to a technical problem that it is difficult to perform IP flow based management.

MAPCON (Multi Access PDN Connectivity): this has simultaneous multiple PDN connectivity for different APNs and can use PMIPv6, GTP and DSMIPv6 as protocol independent technology. All data flows being transmitted through one PDN are moved.

A description will be given of a network structure in which multiple communication systems interwork.

Figure 3:
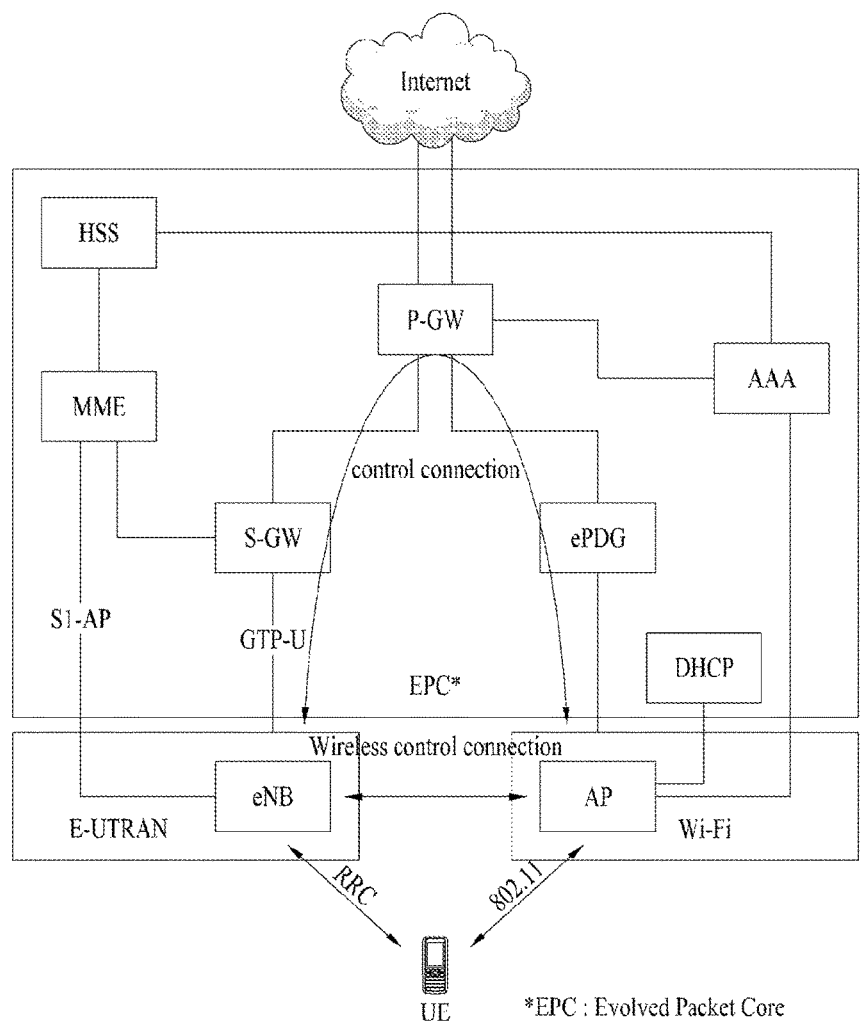
FIG. 3 illustrates a network architecture for explaining an interworking structure of a first communication system (i.e. a cellular communication system) and a second communication system (WLAN communication system)

FIG. 3 illustrates a network architecture for explaining an interworking structure of a first communication system (i.e. cellular communication system) and a second communication system (WLAN communication system). The present invention exemplifies an LTE system, one of cellular communication systems, corresponding to the first communication system and a Wi-Fi system, one of WLAN communication systems, corresponding to the second communication system.

In the network architecture shown in FIG. 3, backhaul control connection or wireless control connection between an AP and a BS may be established through a backbone network (e.g. P-GW or EPC (Evolved Packet Core)). For peak throughput and data traffic offloading, a UE can simultaneously support the first communication system (or first communication network) using a first wireless communication scheme and the second communication system (or second communication network) using a second wireless communication scheme through interworking between multiple communication networks. Here, the first communication network or the first communication system may be referred to as a primary network or a primary system, and the second communication network or the second communication system may be referred to as a secondary network or a secondary system. For example, the UE can be configured to simultaneously support LTE (or LTE-A) and Wi-Fi (short-range communication system such as WLAN/802.11). Such UE is referred to as a multi-system capability UE in the specification.

In the network architecture shown in FIG. 3, the primary system has wider coverage and may be a network for transmitting control information. An example of the primary system is a WiMAX or LTE (LTE-A) system. The secondary system is a network having narrow coverage and may be a system for data transmission. For example, the secondary network can be a WLAN system such as WLAN or Wi-Fi.

The present invention assumes the following.

The present invention will be described on the assumption of the following.

It is assumed that an entity that administrates interworking is present in a cellular network and an interworking function is implemented in the following three entities.

eNB—reuse an existing entity.

MME (Mobility Management Entity)—reuse an existing entity.

IWME (Interworking Management Entity)—define a new entity.

The interworking function is associated with an interworking-related procedure that can be generated between the eNB and UE or between the eNB and AP, and an entity that administrates interworking stores/manages AP information. The eNB/MME/IWME store/manage information of APs under the coverage thereof.

It is assumed that connection between an access point (AP) of the secondary system (e.g. Wi-Fi) and the eNB, which is an access point of the primary system (e.g. cellular communication system such as LTE or WiMAX), is established on a radio link. In the present invention, an AP having a radio interface with an eNB is referred to as an eAP. That is, the eAP needs to support not only 802.11 MAC/PHY but also LTE protocol stack or WiMAX protocol stack for communication with the eNB and can serve as a UE to communicate with the eNB.

Figure 4:
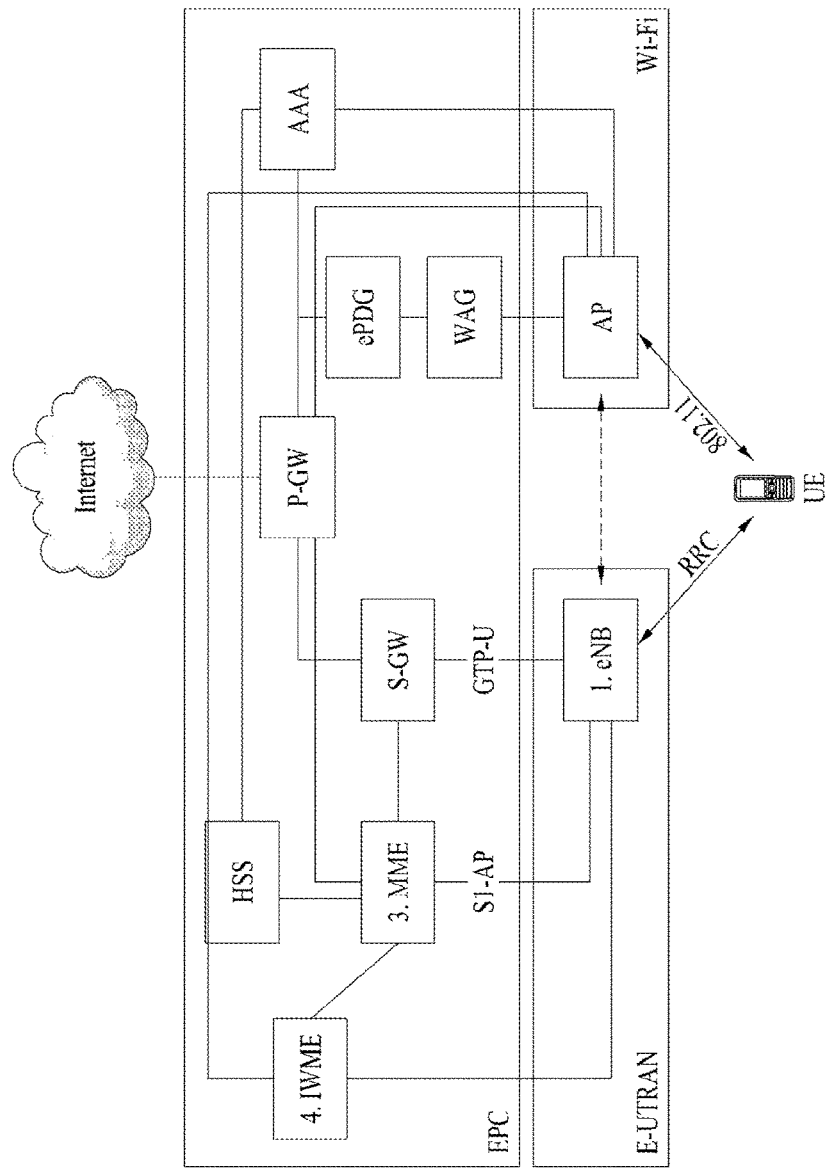
FIG. 4 illustrates a network structure of Wi-Fi-cellular interworking according to the present invention.

FIG. 4 illustrates a network structure of Wi-Fi-cellular interworking according to the present invention.

According to the present invention, a cellular network can manage AP information according to the following four methods to enable a dual-mode or multi-RAT UE to efficiently use a Wi-Fi-cellular convergence network in an environment in which UEs capable of simultaneously transmitting and receiving signals through Wi-Fi and cellular networks are present.

Method 1: an air interface between an eNB and an AP is used.

The eNB controls the AP similarly to a normal UE using wireless control connection with the AP.

Method 2: a backhaul interface between the eNB and the AP is used.

The eNB controls the AP using wireless control connection with the AP.

Method 3: a control interface between an MME and the AP is used.

The AP is controlled using control connection between the MME and the AP (i.e. secondary system).

Method 4: a control interface between an IWME and the AP is used.

The AP is controlled using control connection between the IWME and the AP (i.e. secondary system).

Figure 5:
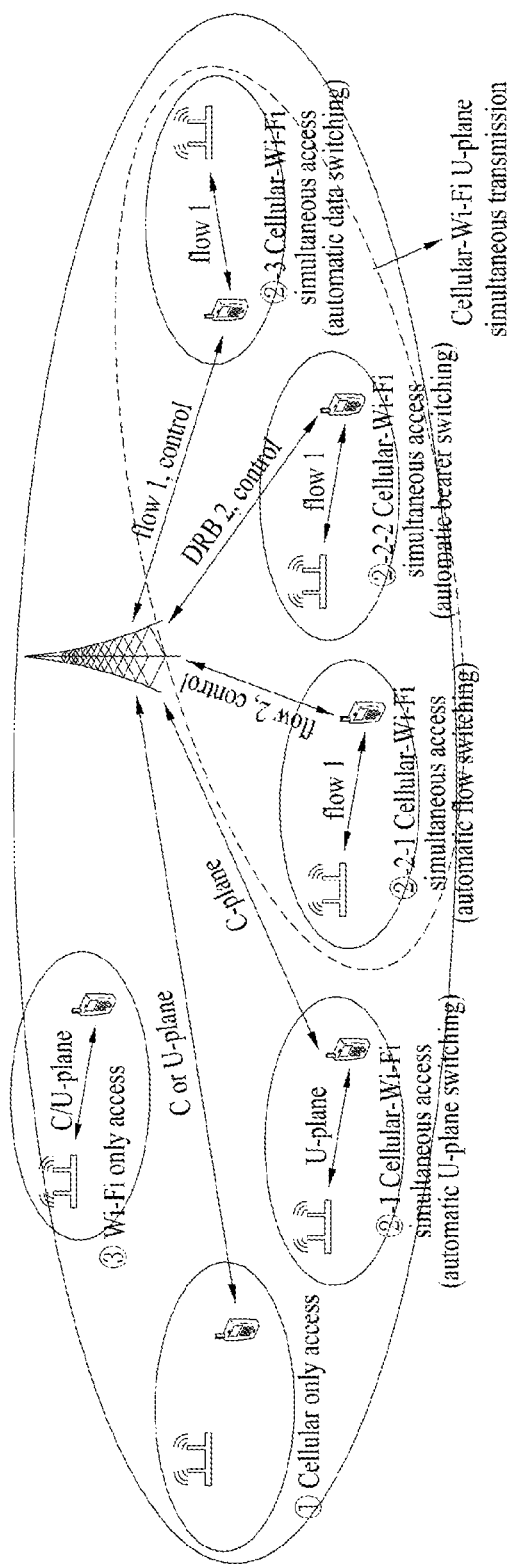
FIG. 5 is a view for explaining Wi-Fi-cellular convergence network scenarios.

FIG. 5 is a view for explaining Wi-Fi-cellular convergence network scenarios.

Scenario ①shown in FIG. 5 is a scenario in which a UE accesses the cellular network only. This scenario requires definition of technology for automatic Wi-Fi switching/simultaneous transmission while the UE accesses the cellular network only. AP information management for interworking is performed at the network level (cellular-Wi-Fi), whereas Wi-Fi discovery and Wi-Fi network access are performed at the device level (cellular-device-Wi-Fi). Scenarios ②-1, ②-2-1, ②-2-2 and ②-3 respectively represent automatic Wi-Fi switching of user plane (U-plane), automatic Wi-Fi switching of a flow, automatic Wi-Fi switching of a bearer and automatic Wi-Fi switching of data between cellular-Wi-Fi. According to ②-1, all data are transmitted through only Wi-Fi upon automatic cellular-Wi-Fi U-plane switching. According to scenarios ②-2 and ②-3, data can be simultaneously transmitted through Wi-Fi and cellular networks using bandwidth segregation or aggregation upon switching of cellular-Wi-Fi U-plane to simultaneous transmission. Here, bandwidth segregation refers to automatic switching per flow (service/IP flow) such as ②-2 and enables different flows to be transmitted through different RATs. In scenario ②-2, automatic switching per flow may be performed for one or more services/IP flows. That is, automatic switching per flow may be flow-based switching (②-2-1) or switching per data radio (or EPS) bearer (②-2-2). Bandwidth aggregation enables a flow to be transmitted through different RATs on a data basis, as shown in ②-3.

After automatic Wi-Fi switching as in scenario ②, Wi-Fi based cellular link control can be performed as in scenario ③. Cellular link related paging or information on control with respect to radio link failure (RLF) can be received through a Wi-Fi link.

Since the conventional inter-RAT is designed on the basis of UE request, interworking between a WLAN and a cellular network is not needed, a specific network server manages WLAN information and inter-RAT handover is enabled at the request of a UE. In addition, the UE is enabled to simultaneously access multiple RATs by supporting only flow mobility/IP-flow mapping at the network level without control at the radio level. For this reason, the conventional technology does not require control connection between an AP and the cellular network and enables access to multiple RATs on the basis of UE request. Such conventional technology cannot recognize correct network state and has a limitation on enhancement of overall network efficiency by selecting RAT based on the UE.

To improve QoS of UEs and overall network efficiency using multi-RAT, it is necessary to provide network-based tightly-coupled Multi-RAT management rather than UE-based multi-RAT. Here, more efficient and faster inter-RAT interworking is required since direct control connection is established between different RATs at the network level, and UE data needs to be transmitted through the best RAT by the corresponding interworking entity.

Owing to performance enhancement (e.g. 3D beamforming) or location restrictions (e.g. cell edge, indoor or the like) of a BS, even when a UE located in a certain area receives a downlink (DL) signal with sufficient intensity from the cellular network, uplink (UL) transmission may be difficult to perform due to UE capability restriction. In this case, the UE needs to recognize that only DL reception can be performed in the area, and thus it is necessary to minimize execution of an unnecessary RACH (Random Access Channel) procedure or initial access procedure. That is, the UE needs to use only downlink link in the cellular system.

As the number of small cells increases and UE performance is enhanced, the UE can transmit UL signals to the BS but the BS may have difficulty in DL reception due to insufficient transmission power or performance of the BS. In this case, the UE needs to recognize that the corresponding area is an area in which only UL transmission can be performed and to receive cellular DL information through Wi-Fi. That is, the UE needs to use only uplink in the cellular system. However, methods and procedures for communication when a cellular network supports only DL or UL have not been proposed.

The present invention assumes that a BS in a cell pre-recognizes information about areas in which DL transmission or UL transmission of a UE through a cellular network cannot be performed, through channel information collected from UEs in the cell or according to setting of an operator.

The present invention describes a method of providing an environment in which a UE capable of simultaneously accessing a WLAN and a cellular network can transmit and receive data of the cellular network through a neighbor Wi-Fi system in a situation in which the UE has difficulty in DL reception or UL transmission through the cellular network. Particularly, the present invention proposes a scheme in which an AP installed in a specific area (e.g. downtown, cell edge or indoor) operates as a system supporting UL or DL of a cellular link when the UE can perform reception or transmission only through one of DL and UL of the cellular network due to physical characteristics or network state, and a UE procedure for using the same.

A description will be given of radio link failure (RLF).

A UE can determine that RLF occurs when the following problem is generated.

(1) RLF is determined to occur due to a physical channel problem.

The UE can determine that out-of-sync has been generated on a physical channel upon detection of quality of a reference signal (RS) periodically received from an eNB over the physical channel, which is less than a threshold. When such out-of-sync is continuously generated a predetermined number of times, the UE notifies RRC of generation of out-of-sync. Upon reception of an out-of-sync message from the physical layer, RRC drives timer T310 and waits to solve the problem of the physical channel during operation of T310. If RRC receives a message representing that in-sync is continuously generated a predetermined number of times (e.g. N310) from the physical layer, RRC stops T310 upon determining that the physical channel problem has been solved. However, when RRC does not receive the in-sync message before T310 expires, RRC determines that RLF has occurred.

(2) RLF is determined to occur due to a MAC random access problem.

When the UE performs a random access procedure in the MAC layer, the UE passes through random access resource selection→random access preamble transmission→random access response reception→contention resolution. These processes are called a random access procedure. When the UE fails in the random access procedure, the UE performs the next random access procedure after waiting for a backoff time. However, if the UE does not successfully perform the random access procedure although the UE has attempted the same a predetermined number times (e.g. preambleTransMax), the UE notifies the RRC of the failure and RRC determines that RLF has occurred.

(3) RLF is determined to occur due to RLC maximum retransmission problem.

When the UE uses AM (Acknowledged Mode) RLC in the RLC layer, the UE retransmits an RLC PDU that has not been successfully transmitted. If AM RLC fails in transmission of a specific AMD PDU in spite of a predetermined number (e.g. maxRetxThreshold) of retransmissions of the AMD PDU, the UE notifies the RRC of the failure and the RRC determines that RLF has occurred.

The RRC determines generation of RLF for the aforementioned three causes. When RLF occurs, RRC connection re-establishment, which is a procedure for re-establishing RRC connection with an eNB, is performed.

Figure 6:
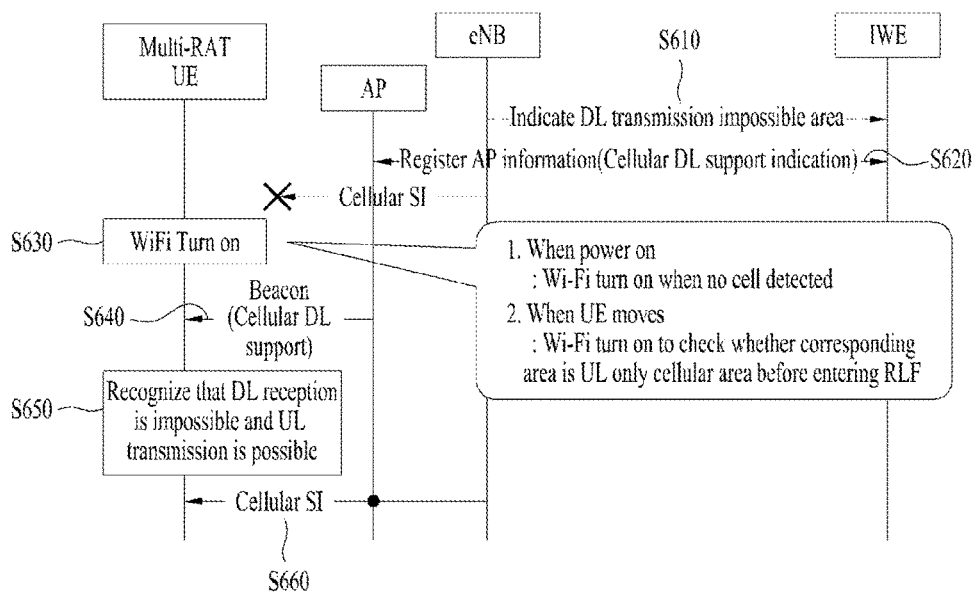
FIG. 6 illustrates a method through which a UE recognizes that only cellular UL transmission can be performed.

FIG. 6 illustrates a method through which a UE recognizes that only cellular UL transmission is possible.

Referring to FIG. 6, an eNB of a cellular network transmits information about an area in which the eNB cannot perform cellular DL transmission to an IWE that manages or operates interworking between the cellular network and a Wi-Fi network (S610). The IWE obtains information about an area in which cellular DL transmission is impossible from an eNB in each cell. The IWE can recognize an AP supporting cellular DL transmission by exchanging information about cellular DL transmission support with APs of the Wi-Fi network (S620). Each AP notifies the IWE whether to support cellular DL transmission (i.e. whether to deliver DL signals received from eNBs to UEs) such that the IWE obtains the information (S620). The eNB of the cellular network cannot transmit system information (SI) of the cellular network to UEs located in the area in which cellular DL transmission is impossible.

When powered on, a multi-RAT UE turns on Wi-Fi when no cell is detected or turns on Wi-Fi in order to check whether the area in which the multi-RAT UE is located is an area in which only cellular UL transmission is possible before entering RLF (S630). Then, the multi-RAT UE can receive a beacon signal including an indicator indicating cellular DL transmission support from at least one neighbor AP (S640). Upon reception of the indicator, the multi-RAT UE can recognize that the corresponding area is an area in which only cellular UL transmission is possible or cellular DL transmission is impossible (S650). Upon recognition of this fact, the multi-RAT UE cannot directly receive a DL signal from an eNB located in the area in which cellular DL transmission is impossible. When the corresponding AP receives a cellular DL signal (e.g. SI of the cellular network) from the eNB, as shown in FIG. 6, the AP delivers the cellular DL signal to the UE such that the UE receives the cellular DL signal (e.g. SI of the cellular network).

According to the aforementioned procedure, even if the UE is located in an area in which cellular DL transmission is impossible, the UE recognizes this fact and turns on Wi-Fi to receive signals from the AP, improving communication performance.

Figure 7:
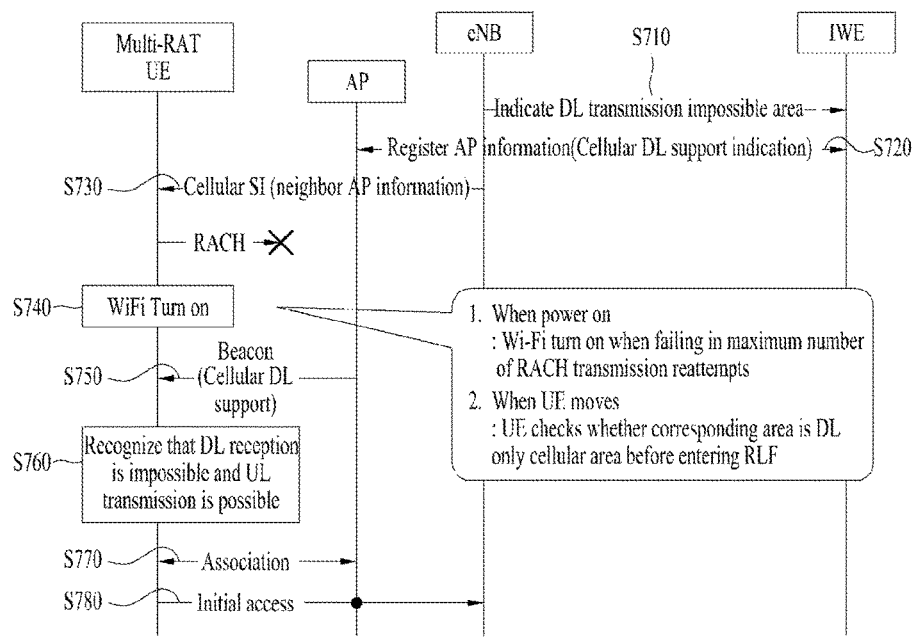
FIG. 7 illustrates a method through which a UE recognizes that only cellular DL transmission can be performed.

FIG. 7 illustrates a method through which a UE recognizes that only cellular DL transmission is possible.

Referring to FIG. 7, an eNB of a cellular network transmits information about an area in which a UE cannot perform cellular UL transmission to an IWE that manages or operates interworking between the cellular network and a Wi-Fi network (S710). The IWE obtains information about an area in which cellular UL transmission is impossible from an eNB in each cell. The IWE can recognize an AP supporting cellular UL transmission by exchanging information about cellular UL transmission support with APs of the Wi-Fi network (S720). Each AP notifies the IWE whether to support cellular UL transmission (i.e. whether to deliver UL signals received from UEs to eNBs) such that the IWE obtains the information (S720). The UE located in the area in which cellular UL transmission is impossible cannot transmit a RACH or a RACH preamble through the cellular network. The UE can receive system information including information about neighbor APs from the eNB (S730).

When powered on, the multi-RAT UE transmits a RACH for network entry. Here, the UE attempts RACH transmission a maximum number of reattempts until RACH transmission is successfully performed. The UE turns on Wi-Fi when failing in RACH transmission although the UE has attempted RACH transmission the maximum number of reattempts, or turns on Wi-Fi in order to check whether the area in which the UE is located is an area in which only cellular DL transmission is possible or cellular UL transmission is impossible before entering RLF (S740). Thereafter, the UE can receive a beacon signal including an indicator indicating cellular UL transmission support from at least one neighbor AP (S750). Upon reception of the indicator, the UE can recognize that the corresponding area is an area in which only cellular DL transmission can be performed or cellular UL transmission is impossible (S760). Upon recognition of this fact, the UE performs a procedure for association with at least one neighbor AP (S770) and transmits a signal for performing an initial access procedure to the AP (S780). The AP receives the initial access signal from the UE and delivers the same to the eNB (S780).

According to the aforementioned procedure, even if the UE is located in an area in which cellular UL transmission is impossible, the UE can recognize this fact and turn on Wi-Fi to transmit UL signals to the eNB through the AP, thereby improving communication performance.

Figure 8:
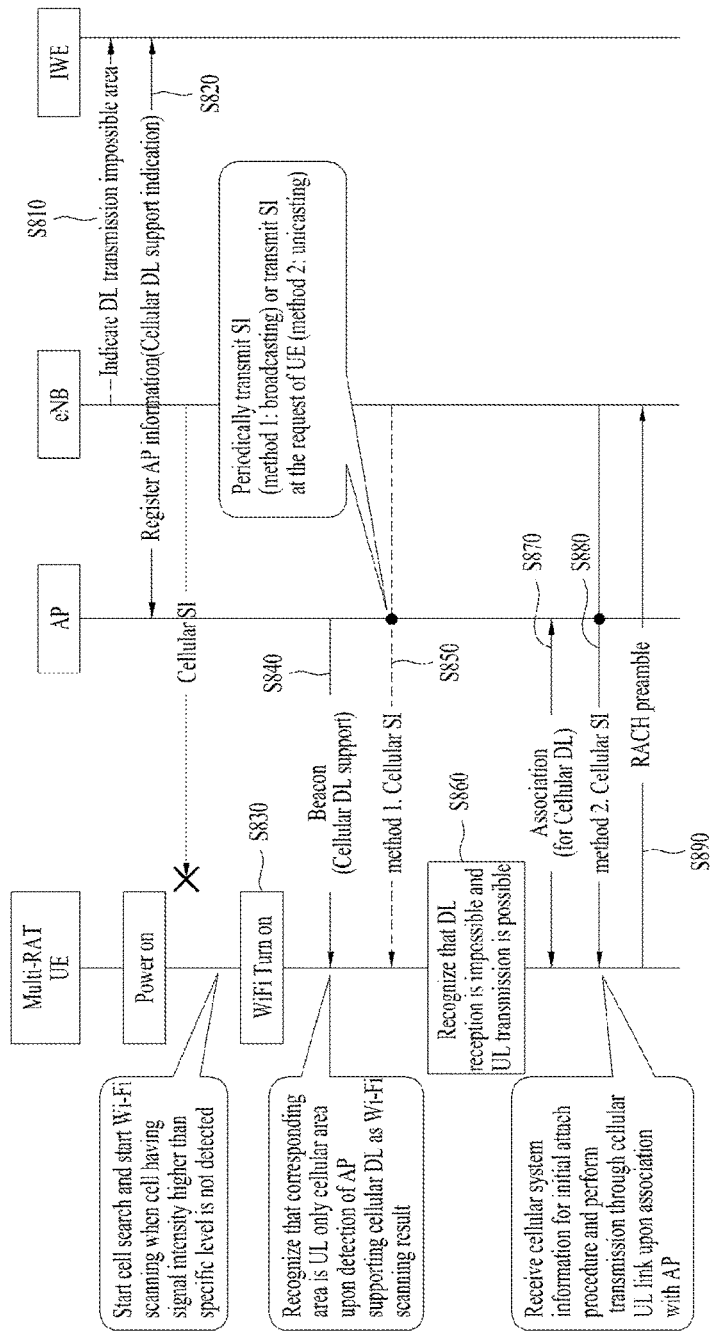
FIG. 8 illustrates a procedure for initial attach of a UE when only cellular UL transmission can be performed.

FIG. 8 illustrates an initial attach procedure of a UE when only cellular UL transmission is possible.

Referring to FIG. 8, an eNB of a cellular network transmits information about an area in which the eNB cannot perform cellular DL transmission to an IWE that manages or operates interworking between the cellular network and a Wi-Fi network (S810). The IWE obtains information about an area in which cellular DL transmission is impossible from an eNB in each cell. The IWE can recognize an AP supporting cellular DL transmission by exchanging information about cellular DL transmission support with APs of the Wi-Fi network (S820). Each AP notifies the IWE whether to support cellular DL transmission (i.e. whether to deliver DL signals received from eNBs to UEs) such that the IWE obtains the information (S820). The eNB of the cellular network cannot transmit system information (SI) of the cellular network to UEs located in the area in which cellular DL transmission is impossible.

When powered on, a UE starts cell search. When the UE does not detect a cell from which a DL signal having predetermined intensity or higher is transmitted, the UE turns on Wi-Fi and performs Wi-Fi scanning (S830). When an AP supporting cellular DL transmission is detected from Wi-Fi scanning, the UE can recognize that the corresponding area is an area in which only cellular UL transmission is possible and cellular DL transmission is impossible (S840). Particularly, when the UE receives a beacon signal including an indicator indicating cellular DL transmission support from at least one neighbor AP (S840), the UE can confirm that the UE is located in an area in which cellular DL transmission is impossible (S860). Upon recognition of this fact, the UE cannot directly receive a DL signal from an eNB located in the area in which cellular DL transmission is impossible.

When the corresponding AP periodically transmits system information of the eNB (S850), the UE can receive the system information of the eNB through the AP even if the UE does not perform a procedure for association with the AP (method 1).

Alternatively, the AP may transmit the system information of the eNB at the request of the UE (S880). To this end, the UE needs to perform a procedure for association with the AP to support cellular DL transmission (S870). Thereafter, the UE can transmit a RACH preamble to the eNB using a cellular UL link (S890).

Figure 9:
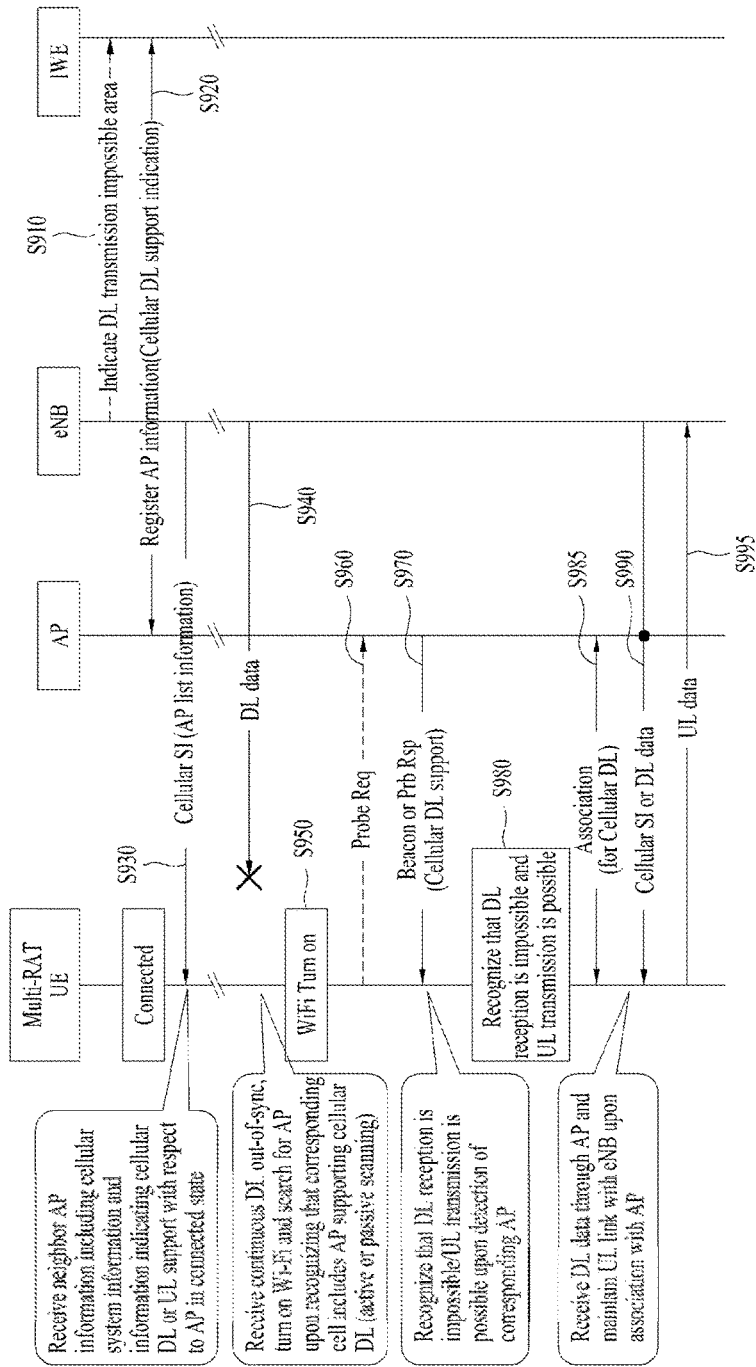
FIG. 9 illustrates a cell search procedure according to movement of a UE when only cellular UL transmission can be performed.

FIG. 9 illustrates a cell search procedure according to movement of a UE when only cellular UL transmission is possible.

Referring to FIG. 9, an eNB of a cellular network transmits information about an area in which the eNB cannot perform cellular DL transmission to an IWE that manages or operates interworking between the cellular network and a Wi-Fi network (S910). The IWE obtains information about an area in which cellular DL transmission is impossible from an eNB in each cell. The IWE can recognize an AP supporting cellular DL transmission by exchanging information about cellular DL transmission support with APs of the Wi-Fi network (S920). Each AP notifies the IWE whether to support cellular DL transmission (i.e. whether to deliver DL signals received from eNBs to UEs) such that the IWE obtains the information (S920). The eNB of the cellular network can transmit, to a UE in an RRC_connected state, cellular system information and information on a list of neighbor APs including information about cellular DL transmission support or cellular UL transmission support for APs (S930).

The RRC_Connected UE determines that quality of a DL signal of the eNB of the cellular network is continuously less than a predetermined threshold (when a predetermined number of continuous DL out-of-sync is generated, for example) and, when recognizing that an AP supporting cellular DL transmission is present in the corresponding cell, turns on Wi-Fi and searches for the AP (S950). The UE can transmit a probe request message to the searched AP (S960) and receive a probe response message or a beacon signal including an indicator indicating cellular DL transmission support from the AP as a response to the probe request message (S970). Upon reception of the probe response message or the beacon signal including the indicator indicating cellular DL transmission support from the AP, the UE can confirm that the UE is located in the area in which cellular DL reception from the eNB is impossible (S980).

The UE needs to perform a procedure for association with the AP to support cellular DL transmission (S985). Thereafter, the UE receives cellular DL data or cellular system information from the AP (S990). The UE can directly transmit UL data to the eNB using a cellular UL link (S995).

Figure 10:
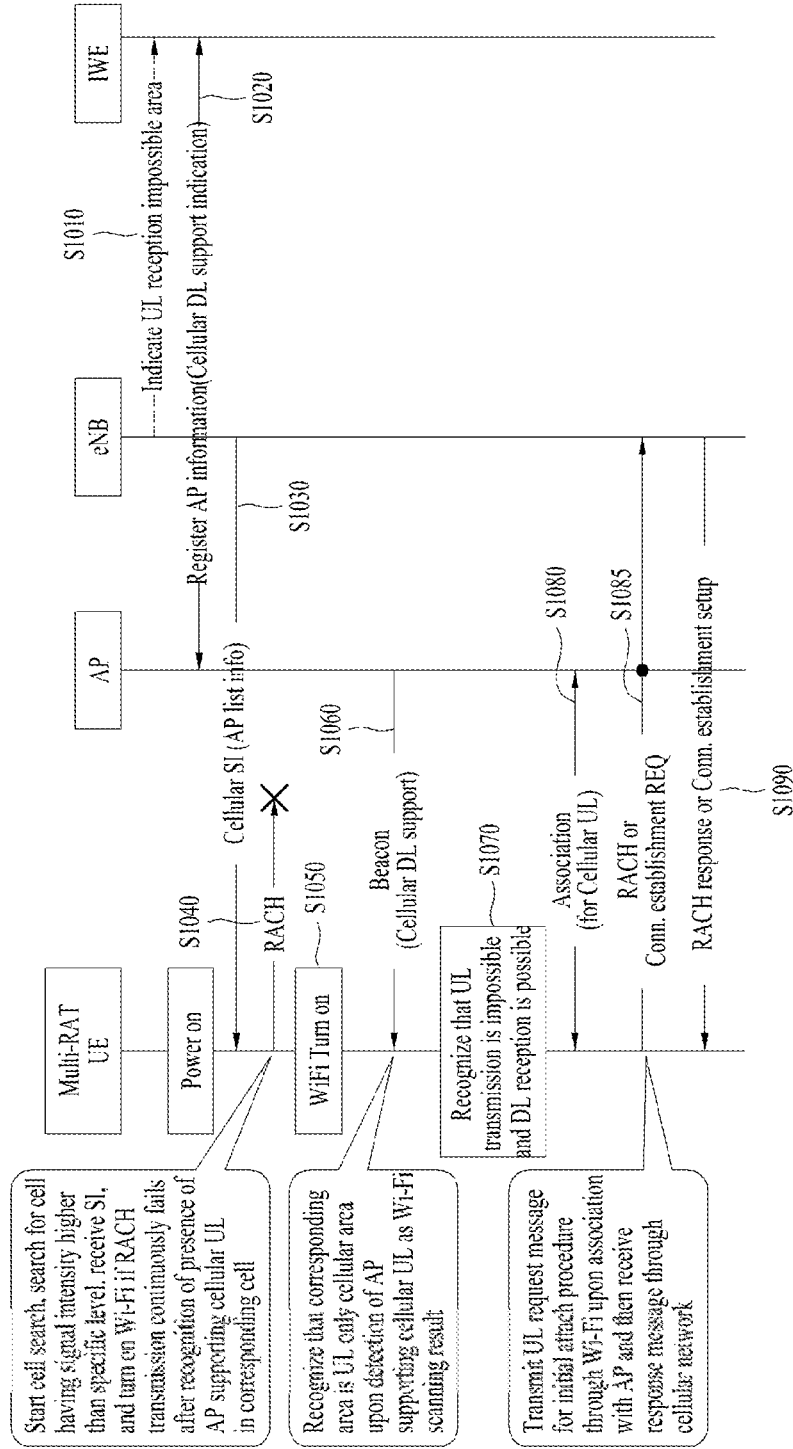
FIG. 10 illustrates an example of an initial attach procedure of a UE when only cellular DL transmission can be performed.

FIG. 10 illustrates an example of an initial attach procedure of a UE when only cellular DL transmission is possible.

Referring to FIG. 10, an eNB of a cellular network transmits information about an area in which a UE cannot perform cellular UL transmission to an IWE that manages or operates interworking between the cellular network and a Wi-Fi network (S1010). The IWE obtains information about an area in which cellular UL transmission is impossible from an eNB in each cell. The IWE can recognize an AP supporting cellular UL transmission by exchanging information about cellular UL transmission support with APs of the Wi-Fi network (S1020). Each AP notifies the IWE whether to support cellular UL transmission (i.e. whether to deliver UL signals received from UEs to eNBs) such that the IWE obtains the information (S1020).

When powered on, the multi-RAT UE starts cell search to search for a cell transmitting a signal having predetermined intensity or higher and receives cellular system information including information on a list of neighbor APs from the eNB (S1030). The UE can recognize presence of an AP supporting cellular UL transmission in the corresponding cell on the basis of the received cellular system information (S1030). The UE located in the area in which cellular UL transmission is impossible cannot transmit a RACH or a RACH preamble through the cellular network. The UE transmits a RACH for network entry. Here, the UE attempts RACH transmission a maximum number of reattempts until RACH transmission is successfully performed (S1040). The UE turns on Wi-Fi when RACH transmission fails although the UE has attempted RACH transmission the maximum number of reattempts (S1050)

Subsequently, the UE performs Wi-Fi scanning, searches for an AP supporting cellular UL transmission as a result of Wi-Fi scanning and receives a beacon signal including an indicator indicating cellular UL transmission support from the searched AP (S1060). Upon reception of the indicator, the UE can recognize that the corresponding area is an area in which cellular UL transmission is impossible or only cellular DL transmission is possible (S1070). Upon recognition of this fact, the UE performs a procedure for association with the searched AP (S1080) and transmits a RACH, a RACH preamble or a connection establishment request message to the AP (S1085). The AP delivers the RACH, RACH preamble or connection establishment request message received from the UE to the eNB (S1085).

According to the aforementioned procedure, when the UE is located in an area in which cellular UL transmission is impossible, the UE can transmit a UL message for the initial attach procedure after association with the AP through Wi-Fi (S1085) and receive a response message to the UL message from the eNB of the cellular network (S1090).

Figure 11:
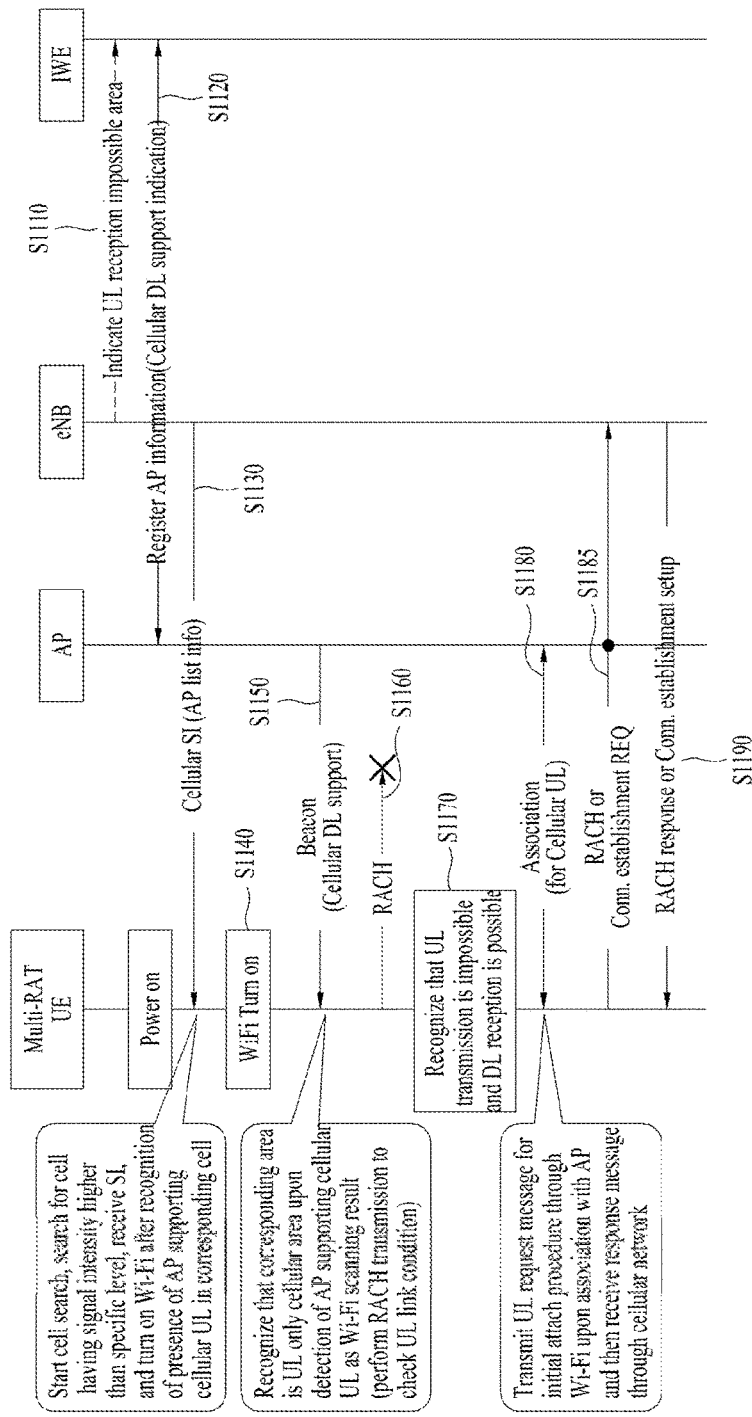
FIG. 11 illustrates another example of an initial attach procedure of a UE when only cellular DL transmission can be performed.

FIG. 11 illustrates another example of the initial attach procedure of a UE when only cellular DL transmission is possible.

Referring to FIG. 11, an eNB of a cellular network transmits information about an area in which a UE cannot perform cellular UL transmission to an IWE that manages or operates interworking between the cellular network and a Wi-Fi network (S1110). The IWE obtains information about an area in which cellular UL transmission is impossible from an eNB in each cell. The IWE can recognize an AP supporting cellular UL transmission by exchanging information about cellular UL transmission support with APs of the Wi-Fi network (S1120). Each AP notifies the IWE whether to support cellular UL transmission (i.e. whether to deliver UL signals received from UEs to eNBs) such that the IWE obtains the information (S1120).

When powered on, the multi-RAT UE starts cell search to search for a cell transmitting a signal having predetermined intensity or higher and receives cellular system information including information on a list of neighbor APs from the eNB (S1130). The UE recognizes presence of an AP supporting cellular UL transmission in the corresponding cell on the basis of the received cellular system information and then turns on Wi-Fi (S1140).

Thereafter, the UE performs Wi-Fi scanning, searches for an AP supporting cellular UL transmission as a result of Wi-Fi scanning and receives a beacon signal including an indicator indicating cellular UL transmission support from the searched AP (S1150). The UE located in the area in which cellular UL transmission is impossible cannot transmit a RACH or a RACH preamble through the cellular network. The UE can attempt RACH transmission in order to check cellular UL link conditions upon recognition of the area in which cellular UL transmission is impossible (S1160).

When the UE fails in RACH transmission although the UE has attempted RACH transmission, the UE confirms that the corresponding area is an area in which cellular UL transmission is impossible or only cellular DL transmission is possible (S1170). Upon recognition of this fact, the UE performs a procedure for association with the searched AP (S1180) and transmits a RACH, a RACH preamble or a connection establishment request message to the AP (S1185). The AP delivers the RACH, RACH preamble or connection establishment request message received from the UE to the eNB (S1185).

According to the aforementioned procedure, when the UE is located in an area in which cellular UL transmission is impossible, the UE can transmit a UL message for the initial attach procedure after association with the AP through Wi-Fi (S1185) and receive a response message to the UL message from the eNB of the cellular network (S1190).

Figure 12:
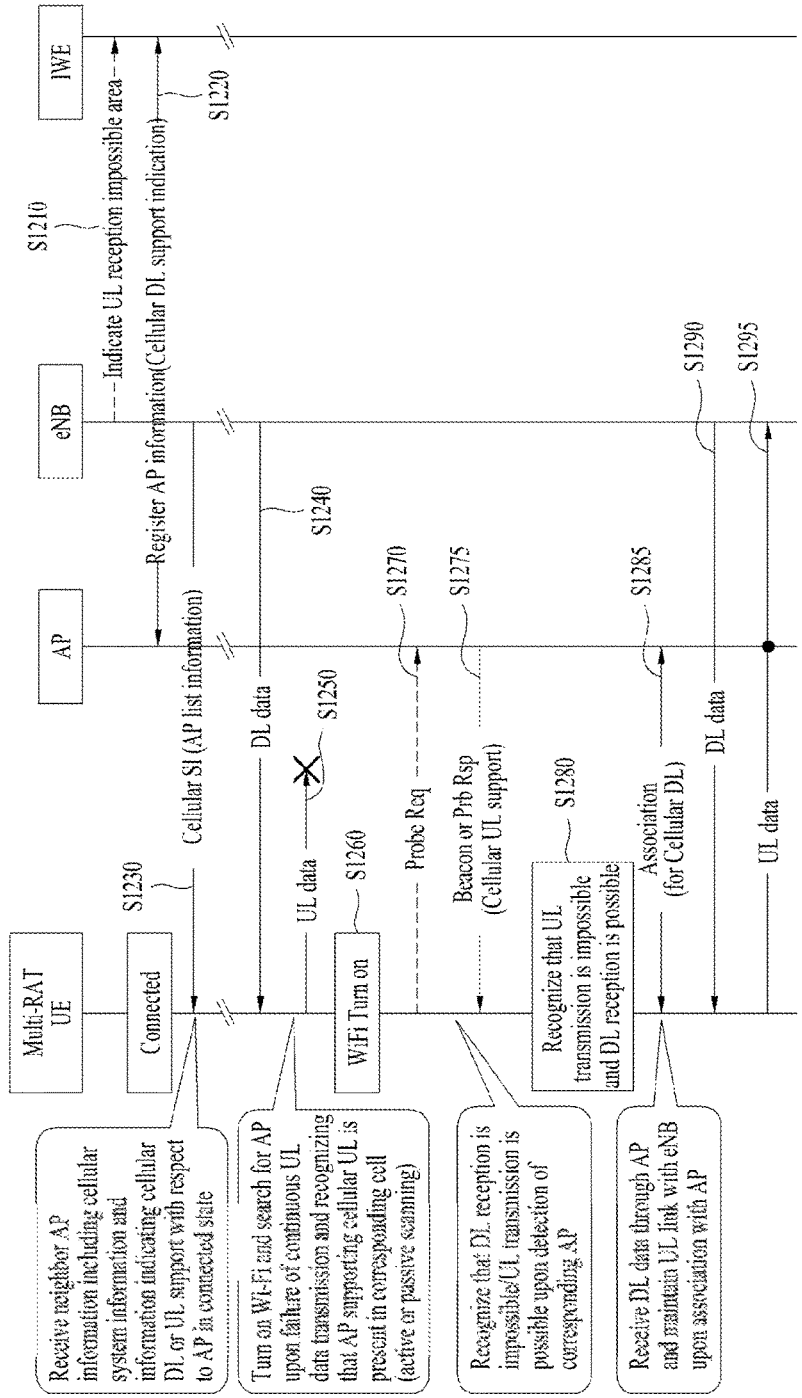
FIG. 12 illustrates a procedure for establishing a UL link to Wi-Fi according to movement of a UE when only cellular DL transmission can be performed.

FIG. 12 illustrates a procedure for establishing a UL link to Wi-Fi according to movement of a UE when only cellular DL transmission is possible.

Referring to FIG. 12, an eNB of a cellular network transmits information about an area in which a UE cannot perform cellular UL transmission to an IWE that manages or operates interworking between the cellular network and a Wi-Fi network (S1210). The IWE obtains information about an area in which cellular UL transmission is impossible from an eNB in each cell. The IWE can recognize an AP supporting cellular UL transmission by exchanging information about cellular UL transmission support with APs of the Wi-Fi network (S1220). Each AP notifies the IWE whether to support cellular UL transmission (i.e. whether to deliver UL signals received from UEs to eNBs) such that the IWE obtains the information (S1220).

The eNB of the cellular network can transmit, to a UE in an RRC_connected state, cellular system information and information on a list of neighbor APs including information about cellular DL transmission support or cellular UL transmission support for APs (S1230).

The RRC_Connected UE can receive downlink data from the eNB of the cellular network (S1240). Then, the UE attempts UL data transmission (S1250). When UL data transmission of the UE fails, the UE turns on Wi-Fi and searches for an AP supporting cellular UL transmission if the AP is present in the corresponding cell (S1260). The UE can transmit a probe request message to the detected AP (S1270) and receive a probe response message or a beacon signal including an indicator indicating cellular UL transmission support from the AP as a response to the probe request message (S1275). Upon reception of the probe response message or the beacon signal including the indicator indicating cellular UL transmission support from the AP, the UE can confirm that the UE is located in the area in which cellular UL transmission from the eNB is impossible (S1280).

Upon confirmation of this fact, the UE can perform a procedure for association with the AP (S1285) and directly receive DL data from the eNB (1290). However, UL data is delivered to the eNB via the AP (S1295).

As described above, when a UE capable of simultaneously accessing a cellular network and a Wi-Fi network enters an area in which only cellular DL transmission or only cellular UL transmission is possible, the present invention transmits information about Wi-Fi supporting a cellular UL or DL link in a corresponding cell such that the UE recognizes that an area in which UL or DL transmission is impossible is present in the corresponding cell through cellular system information.

In the description of FIGS. 6 to 12, when the eNB transmits the information on the list of APs belonging to the corresponding cell, the eNB may transmit an indicator indicating cellular link support (e.g. cellular DL transmission support or cellular UL transmission support) for each AP along with the information. Here, the indicator may be set to 1 bit. When a UE that enters a cell to which cellular link support indication is set detects a cellular DL or UL link problem, the UE may preferentially search Wi-Fi for radio link recovery. The AP list information is a broadcast message and may be of a message type delivering neighbor AP information or a system information block (SIB) type The corresponding AP may define an element delivering cellular capability in a beacon message thereof and transmit the beacon message including the element to the UE. The cellular capability element may include an indicator indicating cellular DL transmission support or cellular UL transmission support. Upon detection of a problem in cellular DL or UL, the UE recognizes that the UE is located in a cellular DL transmission or cellular UL transmission area and attempts to establish cellular UL or DL through an AP to which indication is set by the indicator when the AP has been searched.

A description will be given of a method of detecting a radio link problem in a 3GPP LTE system.

In the case of UL, PREAMBLE_TRANSMISSION_COUNTER is increased by 1 whenever RACH transmission fails, and the MAC layer indicates a radio problem when PREAMBLE_TRANSMISSION_COUNTER= PREAMBLE_TRANS_MAX+1 is satisfied or when the number of RACH transmissions exceeds a maximum number of retransmissions in RLC. In the case of DL, DL radio link quality is continuously measured and, when continuous out-of-sync that does not exceed a predetermined threshold Qout is detected form the physical layer, a radio link problem is indicated.

As described above, a UE enters RLF upon detecting inferior DL or UL link state in the conventional system. However, a UE in an environment in which cellular DL transmission is impossible needs to be prevented from entering RLF based on radio link quality only. In addition, the UE in an environment in which cellular UL transmission is impossible needs to be prevented from RLF through RACH transmission failure.

Figure 13:
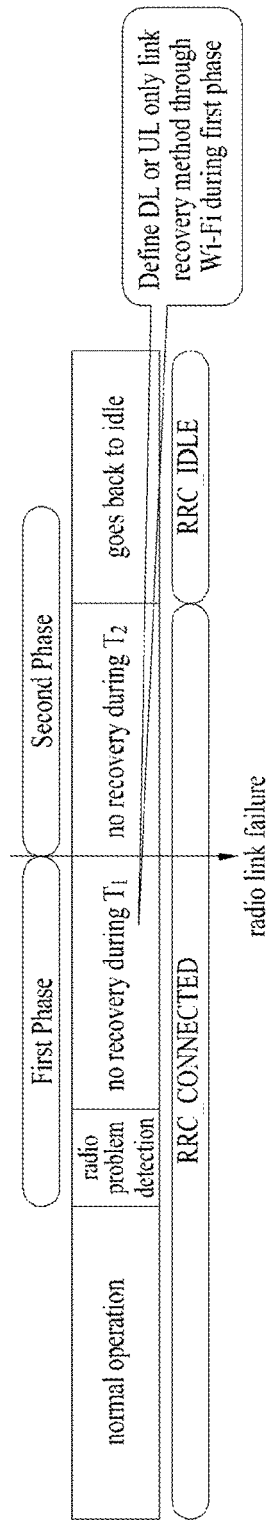
FIG. 13 is a view for explaining a method of entering radio link failure to solve problems in conventional LTE systems.

FIG. 13 illustrates a method of entering RLF to overcome problems in conventional LTE systems.

Upon detection of a radio link problem, a UE in an RRC_connected state regards connection establishment through Wi-Fi as successful recovery even if DL or UL is not recovered. A method of recovering DL or UL through Wi-Fi can be defined during a first phase shown in FIG. 13. That is, when cellular DL or UL has a problem, as described above with reference to FIGS. 6 to 12, a procedure of recovering DL or UL through Wi-Fi can be performed during the first phase.

When the UE detects an AP that supports cellular DL/UL transmission from among neighbor APs with reference to neighbor AP information received from the corresponding cell, the UE can indicate continuous cellular UL or DL transmission even if entering a stage of detecting a radio link problem with respect to cellular DL or UL transmission. A UE in an RRC_connected state can detect a radio link problem during a normal operation. When the UE detects a DL problem, the UE signals the DL link problem through UL, searches for APs supporting cellular DL transmission through received information thereon and establishes connection thereto. When the UE detects a UL problem, the UE continuously monitors data received through DL. When signal intensity of the received data exceeds a threshold Qin, the UE searches for an AP supporting cellular UL transmission through received information thereon and establishes connection thereto.

Figure 14:
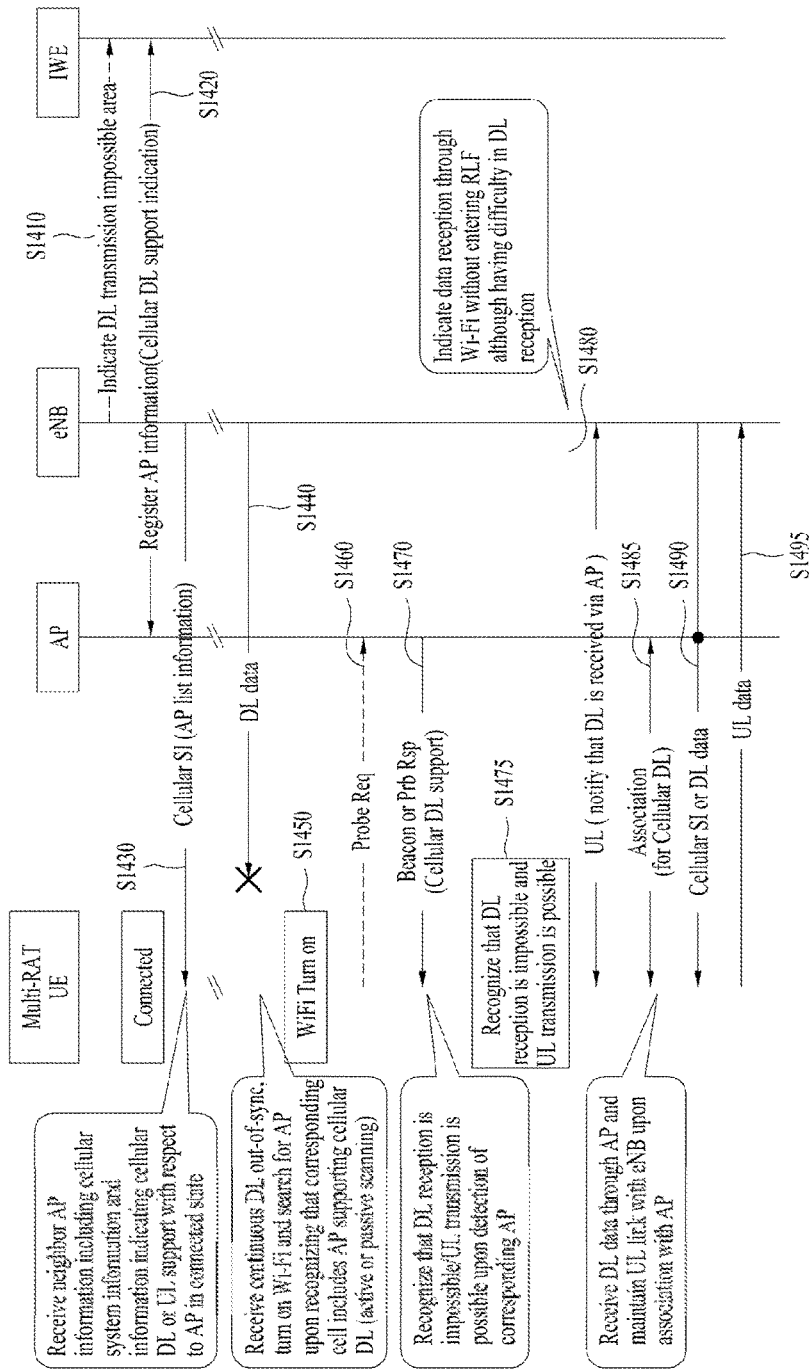
FIG. 14 illustrates a cell search procedure according to movement of a UE when only cellular UL transmission can be performed.

FIG. 14 illustrates a cell search procedure according to movement of a UE when only cellular UL transmission is possible.

Referring to FIG. 14, an eNB of a cellular network transmits information about an area in which the eNB cannot perform cellular DL transmission to an IWE that manages or operates interworking between the cellular network and a Wi-Fi network (S1410). The IWE obtains information about an area in which cellular DL transmission is impossible from an eNB in each cell. The IWE can recognize an AP supporting cellular DL transmission by exchanging information about cellular DL transmission support with APs of the Wi-Fi network (S1420). Each AP notifies the IWE whether to support cellular DL transmission (i.e. whether to deliver DL signals received from eNBs to UEs). The eNB of the cellular network can transmit, to a UE in an RRC_connected state, cellular system information and information on a list of neighbor APs including information about cellular DL transmission support or cellular UL transmission support for APs (S1430). The UE cannot directly receive DL data from the eNB since the UE is located in the area in which cellular DL transmission is impossible (S1440).

The RRC_connected UE determines that quality of a DL signal of the eNB of the cellular network is continuously less than a predetermined threshold a predetermined number of times (determines a predetermined number of continuous DL out-of-sync, for example) and, upon recognizing that an AP supporting cellular DL transmission is present in the corresponding cell, turns on Wi-Fi and searches for the AP (S1450). The UE can transmit a probe request message to the searched AP (S1460) and receive a probe response message or a beacon signal including an indicator indicating cellular DL transmission support from the AP as a response to the probe request message (S1470). Upon reception of the probe response message or the beacon signal including the indicator indicating cellular DL transmission support from the AP, the UE can confirm that the UE is located in the area in which cellular DL reception from the eNB is impossible (S1475).

The UE can transmit information indicating that the UE will receive a DL signal through the AP to the eNB through a cellular UL (S1480). That is, the UE notifies the eNB that the UE will receive data through Wi-Fi without entering RLF although the UE has difficulty in DL reception (S1480). Thereafter, the UE can perform a procedure for association with the AP to support cellular DL transmission (S1485). Subsequently, the UE receives cellular DL data or cellular system information from the AP (S1490). Thereafter, the UE can directly transmit UL data to the eNB using the cellular UL (S1495).

Figure 15:
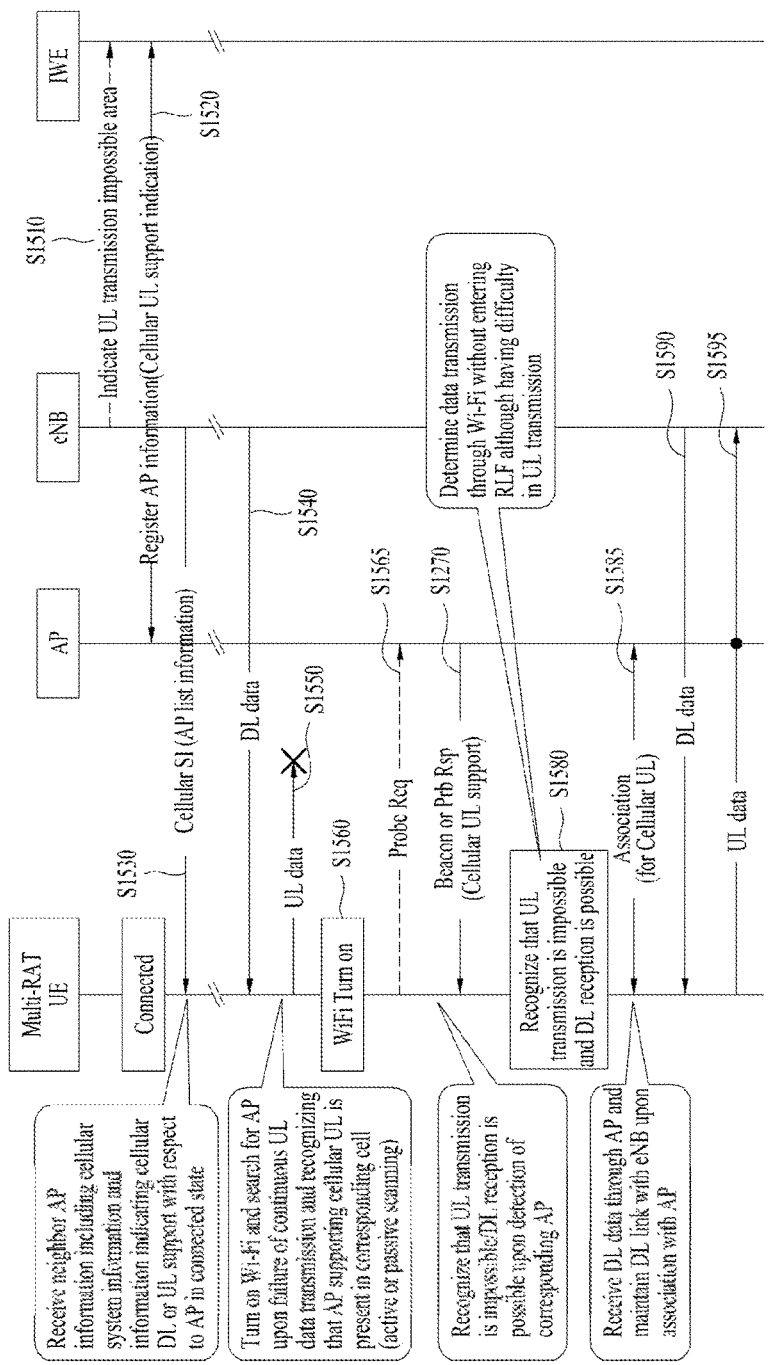
FIG. 15 illustrates a procedure for establishing a UL link to Wi-Fi according to movement of a UE when only cellular DL transmission can be performed.

FIG. 15 illustrates a procedure for establishing a UL to Wi-Fi according to movement of a UE when only cellular DL transmission is possible.

Referring to FIG. 15, an eNB of a cellular network transmits information about an area in which a UE cannot perform cellular UL transmission to an IWE that manages or operates interworking between the cellular network and a Wi-Fi network (S1510). The IWE obtains information about an area in which cellular UL transmission is impossible from an eNB in each cell. The IWE can recognize an AP supporting cellular UL transmission by exchanging information about cellular UL transmission support with APs of the Wi-Fi network (S1520). Each AP notifies the IWE whether to support cellular UL transmission (i.e. whether to deliver UL signals received from UEs to eNBs) such that the IWE obtains the information (S1520).

The eNB of the cellular network can transmit, to a UE in an RRC_connected state, cellular system information and information on a list of neighbor APs including information about cellular DL transmission support or cellular UL transmission support for APs (S1530).

The RRC_connected UE can receive DL data from the eNB of the cellular network (S1540). Then, the UE attempts UL data transmission (S1550). When UL data transmission of the UE fails, the UE turns on Wi-Fi and searches for an AP supporting cellular UL transmission if the AP is present in the corresponding cell (S1560). The UE can transmit a probe request message to the AP (S1565) and receive a probe response message or a beacon signal including an indicator indicating cellular UL transmission support from the AP as a response to the probe request message (S1570). Upon reception of the probe response message or the beacon signal including the indicator indicating cellular UL transmission support from the AP, the UE can confirm that the UE is located in the area in which cellular UL transmission from the eNB is impossible (S1580). The UE determines transmission of UL data through Wi-Fi without entering RLF although the UE has difficulty in UL transmission through a cellular UL (S1580).

Upon confirmation of this fact, the UE can perform a procedure for association with the searched AP (S1585) and directly receive DL data from the eNB (1590). However, UL data is delivered to the eNB via the AP (S1595).

According to the aforementioned embodiments of the present invention, a UE capable of simultaneously accessing a WLAN (Wi-Fi) and a cellular network can transmit and receive cellular network data through a neighbor Wi-Fi system when the UE has difficulty in DL reception or UL transmission through the cellular network, thereby remarkably improving communication performance.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting UL signals in a communication environment in which multiple communication systems interwork is industrially applicable in wireless communication systems such as 3GPP LTE-A.

The invention claimed is:
1. A method of receiving a downlink signal by a user equipment (UE) in a communication environment in which a plural communication systems interwork, the method comprising:
   receiving information of a list of base stations of a second communication system adjacent to the user equipment from a base station of a first communication system through a first communication system link;
   when quality of downlink signals received from the base station of the first communication system do not continuously satisfy a threshold a predetermined number of times,
      turning on a second communication system mode based on the information of list of base stations of the second communication system; and
      receiving a beacon signal or a probe response message from a base station included in the list of base stations of the second communication system through a second communication system link, the base station included in the list of base stations of the second communication system supporting downlink transmission of the first communication system;
based on the beacon signal or the probe response message, recognizing that downlink transmission through the first communication system link is impossible or only uplink transmission through the first communication system link is possible;
performing an association procedure with the base station supporting the downlink transmission of the first communication system based on a result of the recognizing; and
receiving downlink data or system information of the base station of the first communication system from the base station supporting the downlink transmission of the first communication system through the second communication system link,
wherein the beacon signal or the probe response message includes an indicator indicating support of the downlink transmission of the first communication system,
wherein the information on the list of base stations of the second communication system includes an indicator indicating whether a base station of the second communication system supports downlink or uplink transmission through the first communication system link.

2. The method according to claim 1, further comprising: transmitting, to the base station of the first communication system, an indicator indicating that the downlink signal will be received from a base station supporting downlink transmission of the first communication system.

3. The method according to claim 1, further comprising: transmitting uplink data to the base station of the first communication system through the first communication system link.

4. The method according to claim 1, wherein the first communication system is a cellular communication system and the second communication system is a wireless LAN (WLAN) communication system.

5. The method according to claim 1, where the base station supporting the downlink transmission of the first communication system is a base station belonging to the second communication system which can deliver a downlink signal received through the first communication system link to the user equipment.

6. A method of transmitting an uplink signal by a user equipment in a communication environment in which a plural communication systems interwork, the method comprising:
searching for a base station of a first communication system, the base station having signal intensity of higher than a threshold;
receiving, from the searched base station of the first communication system, information of a list of base stations of a second communication system adjacent to the user equipment through a first communication system link;
turning on a second communication system mode when failing in a predetermined number of random access channel (RACH) transmissions to the searched base station of the first communication system;
receiving a beacon signal including an indicator indicating support of uplink transmission of the first communication system from a base station included in the information of the list of base stations of the second communication system;
based on the beacon signal, recognizing that the uplink transmission through the first communication system link is impossible or only downlink transmission through the first communication system link is possible;
performing an association procedure with the base station supporting uplink transmission of the first communication system; and
transmitting a RACH signal or a connection establishment request message to the base station supporting uplink transmission of the first communication system,
wherein the information of the list of base stations of the second communication system includes an indicator indicating whether a base station of the second communication system supports downlink or uplink transmission through the first communication system link.

7. The method according to claim 6, wherein the base station supporting the uplink transmission of the first communication system is a base station belonging to the second communication system, receiving an uplink signal for transmission to the first communication system by the user equipment and transmitting the uplink signal to the searched base station of the first communication system.

8. The method according to claim 6, wherein the first communication system is a cellular communication system and the second communication system is a wireless LAN (WLAN) communication system.

9. A user equipment (UE) for receiving a downlink signal in a communication environment in which a plural communication systems interwork, the user equipment comprising:
a transceiver; and
a processor connected with the transceiver,
wherein the processor is configured to:
control the transceiver to receive information of a list of base stations of a second communication system adjacent to the user equipment from a base station of a first communication system through a first communication system link,
turn on a second communication system mode on the basis of the information of the list of the second communication system when quality of downlink signals received from the base station of the first communication system do not continuously satisfy a threshold a predetermined number of times,
control the transceiver to receive a beacon signal or a probe response message from a base station included in the list of base stations of the second communication system through a second communication system link, the base station included in the list of base stations of the second communication system supporting downlink transmission of the first communication system,
based on the beacon signal or the probe response message, recognize that downlink transmission through the first communication system link is impossible or only uplink transmission through the first communication system link is possible,
perform an association procedure with the base station supporting the downlink transmission of the first communication system based on a result of the recognizing; and
control the transceiver to receive downlink data or system information of the base station of the first communication system from the base station supporting the downlink transmission of the first communication system through the second communication system link, wherein the beacon signal or the probe response message includes an indicator indicating support of the downlink transmission of the first communication system, wherein the information of the list of base stations of the second communication system includes an indicator indicating whether a base station of the second communication system supports downlink or uplink transmission through the first communication system link.

10. A user equipment (UE) for transmitting an uplink signal in a communication environment in which a plural communication systems interwork, the user equipment comprising:

a transceiver; and a processor connected with the transceiver, wherein the processor is configured to:

search for a base station of a first communication system, the base station having signal intensity of higher than a threshold, control the transceiver to receive, from the searched base station of the first communication system, information of a list of base stations of a second communication system adjacent to the user equipment through a first communication system link, turn on a second communication system mode when a predetermined number of RACH transmissions to the searched base station of the first communication system fail, control the transceiver to receive a beacon signal including an indicator indicating support of uplink transmission of the first communication system from a base station included in the information of the list of base station of the second communication system, based on the beacon signal, recognize that uplink transmission through the first communication system link is impossible or only downlink transmission through the first communication system link is possible, perform an association procedure with the base station supporting uplink transmission of the first communication system, and control the transceiver to transmit a RACH signal or a connection establishment request message to the base station supporting uplink transmission of the first communication system, wherein the information of the list of base stations of the second communication system includes an indicator indicating whether a base station of the second communication system supports downlink or uplink transmission through the first communication system link.

* * * * *